(12) United States Patent
Cameron et al.

(10) Patent No.: US 6,903,882 B1
(45) Date of Patent: Jun. 7, 2005

(54) MAGNIFIER WITH PERSONALIZABLE MULTIPART HANDLE

(75) Inventors: Richard Cameron, Syosset, NY (US); Gin Fai Yip, North Point (HK)

(73) Assignees: Carson Optical, Hauppauge, NY (US); Leading Extreme Optimist Industries, Ltd., Chai Wan (HK)

( * ) Notice: Subject to any disclaimer, the term of this patent is extended or adjusted under 35 U.S.C. 154(b) by 0 days.

(21) Appl. No.: 10/753,788

(22) Filed: Jan. 8, 2004

(51) Int. Cl.[7] .......................... G02B 27/02; G02B 7/02; G03B 21/14; F21V 17/00

(52) U.S. Cl. ...................... 359/803; 359/802; 353/100; 362/455

(58) Field of Search ................................ 359/802, 803, 359/808, 809, 819; 362/455; 353/100

(56) References Cited

U.S. PATENT DOCUMENTS

| | | | |
|---|---|---|---|
| 1,211,468 A | 1/1917 | McLean | |
| RE14,589 E | 2/1919 | Booth | |
| 1,990,957 A | 2/1935 | Ridges | |
| 2,136,646 A | 11/1938 | Steinen | |
| 2,139,564 A | 12/1938 | Steinen | |
| 2,317,123 A | 4/1943 | Warp | |
| 2,747,310 A | 5/1956 | Tierney | |
| 2,918,741 A | 12/1959 | Welter et al. | |
| 4,534,126 A | 8/1985 | Gilman | |
| 5,021,933 A * | 6/1991 | Cordes | 362/109 |
| 5,264,267 A | 11/1993 | Wang | |
| 5,301,443 A | 4/1994 | Gori | |
| 5,672,089 A | 9/1997 | Piera Bermejo | |
| 5,709,005 A | 1/1998 | Brach, Jr. et al. | |
| 5,810,372 A | 9/1998 | Arendt | |
| 6,138,292 A | 10/2000 | O'Toole | |
| 6,764,192 B2 * | 7/2004 | McChesney | 362/98 |
| 2002/0124864 A1 * | 9/2002 | Gross et al. | 132/311 |

* cited by examiner

*Primary Examiner*—Hung Xuan Dang
*Assistant Examiner*—Joseph Martinez
(74) *Attorney, Agent, or Firm*—Carmody & Torrance LLP (57) ABSTRACT

A multipart handle for coupling to a magnifying lens is provided. In a preferred embodiment, the multipart handle comprises a head member comprising a first end coupleable to the lens and a second end having a cavity formed therein; a body section having a channel for receiving a material member, wherein the body section comprises a first body member having a first end and a second end and a second body member having a first end and a second end; wherein the first end of the first body member is securable within the cavity of the head member and the first end of the second body member is securable within the cavity of the head member; wherein the second end of the first body member is press-fitted to the second end of the second body member; wherein the securing together of the respective second ends of the body members maintains the material member in the channel. In a particular embodiment, a combination magnifying lens and a personalizable handle for coupling to the magnifying lens is also provided. Lastly, a method of forming a customizable multipart handle for an object is also provided.

12 Claims, 9 Drawing Sheets

MAGNIFIER WITH PERSONALIZABLE MULTIPART HANDLE

BACKGROUND OF THE INVENTION

The present invention relates generally to magnifiers, and in particular, to an improved handle assembly therefor. In particular, the present invention is directed to a personalizable multipart handle for a magnifier, which by its construction and assembly provides for significant advantages over similar handles currently available. However, as will become clear below, the present invention is widely applicable to a range of objects other than merely a magnifying lens.

The personalization of objects, such as golf balls, cups or t-shirts or the like, is very popular. Providing such "novelty items" at corporate events or as giveaways provides companies with free advertising as well as continued name recognition. Similarly, providing such "novelty items" at personal functions or events provides a popular way to remember the event. Printing on a golf ball, cup and/or t-shirt, relatively speaking, is easy since the medium (e.g. surlyn, plastic and cotton, respectively) is immediately accessible by the printing machine.

Methodologies and constructions for personalizing other objects, such as toothbrushes (U.S. Pat. No. 2,317,123), brushes (U.S. Pat. No. 2,136,646), shopping cart handles for personalized advertising (U.S. Pat. No. 5,301,443), checkout counter dividers (U.S. Pat. No. 4,534,126), luggage handles (U.S. Pat. No. 2,747,310), squeegee devices (U.S. Pat. No. 5,709,005) and toilet handles (U.S. Pat. No. 6,138,292), are known.

Notwithstanding all the known methodologies and construction to personalize a handle for an object however, it is believed that still further advancements in the art are achievable. In particular, it is desirable to construct a personalizable handle that is both inexpensive to manufacture yet very aesthetically pleasing. Currently, expensive molding and printing techniques can achieve the latter criterion, at the sacrifice of cost. Likewise, inexpensive printing techniques can satisfy the cost constraints, at the expense of a desirable and professional looking product.

Accordingly, it is desirable to provide a construction and methodology of forming a personalizable multipart handle for an object, and a magnifying lens in particular, that overcomes the foregoing perceived deficiencies as well as achieves the aforementioned and below mentioned objects and advantages.

OBJECTS AND SUMMARY OF THE INVENTION

Accordingly, it is an object of the present invention to provide an improved personalizable handle for an object.

It is a particular object of the present invention to provide an improved personalizable handle for a magnifier.

It is yet another object of the present invention to provide a personalizable handle that can be used in connection with a variety of objects.

It is still another object of the present invention to provide an improved personalizable handle that is inexpensive to manufacture.

Yet a further object of the present invention is to provide an improved personalizable handle that is aesthetically pleasing.

Still another object of the present invention is to provide a construction of a handle that is at least partially transparent so that indicia, which is viewable therethrough, appears to be floating therewithin.

It is yet another object of the present invention to provide an improved method of constructing a personalizable handle for an object.

Further objects and advantages of this invention will become more apparent from a consideration of the drawings and ensuing description.

The invention accordingly comprises the features of construction, combination of elements and arrangement of parts and sequence of steps which will be exemplified in the construction, illustration and description hereinafter set forth, and the scope of the invention will be indicated in the claims.

Generally speaking, a multipart handle for coupling to an object, such as but not necessarily, a magnifying lens, is provided. If being coupled to a magnifying lens, in a preferred embodiment, the multipart handle comprises a head member comprising a first end coupleable to the lens and a second end having a cavity formed therein; a body section having a channel for receiving a material member, wherein the body section comprises a first body member having a first end and a second end and a second body member having a first end and a second end; wherein the first end of the first body member is securable within the cavity of the head member and the first end of the second body member is securable within the cavity of the head member; and means for securing the second end of the first body member to the second end of the second body member; wherein the securing together of the respective second ends of the body members maintains the material member in the channel. In a particular embodiment, a combination magnifying lens and a personalizable handle for coupling to the magnifying lens is also provided. Lastly, a method of forming a customizable multipart handle for an object is also provided.

BRIEF DESCRIPTION OF THE DRAWINGS

Like reference numerals in the various Figures illustrate like parts, but not every part in every figure is so identified.

DETAILED DESCRIPTION OF THE PREFERRED EMBODIMENT

As set forth in the Background Section above, and as will be appreciated below, the present invention is primarily directed to a multipart handle, and to the personalization thereof. By personalization, it is meant, and should be understood to include the ability to permit "personalized" advertising indicia, as well as, by way of example, personal names or the name of a company and/or ornamental designs. Moreover, because the present invention is primarily directed to a multipart handle and not necessarily to the object to which it is coupled, it should be understood (and is meant to be) applicable to a wide range of objects, which include, but are not limited to the present preferred object, namely a magnifying lens.

Figure 1:
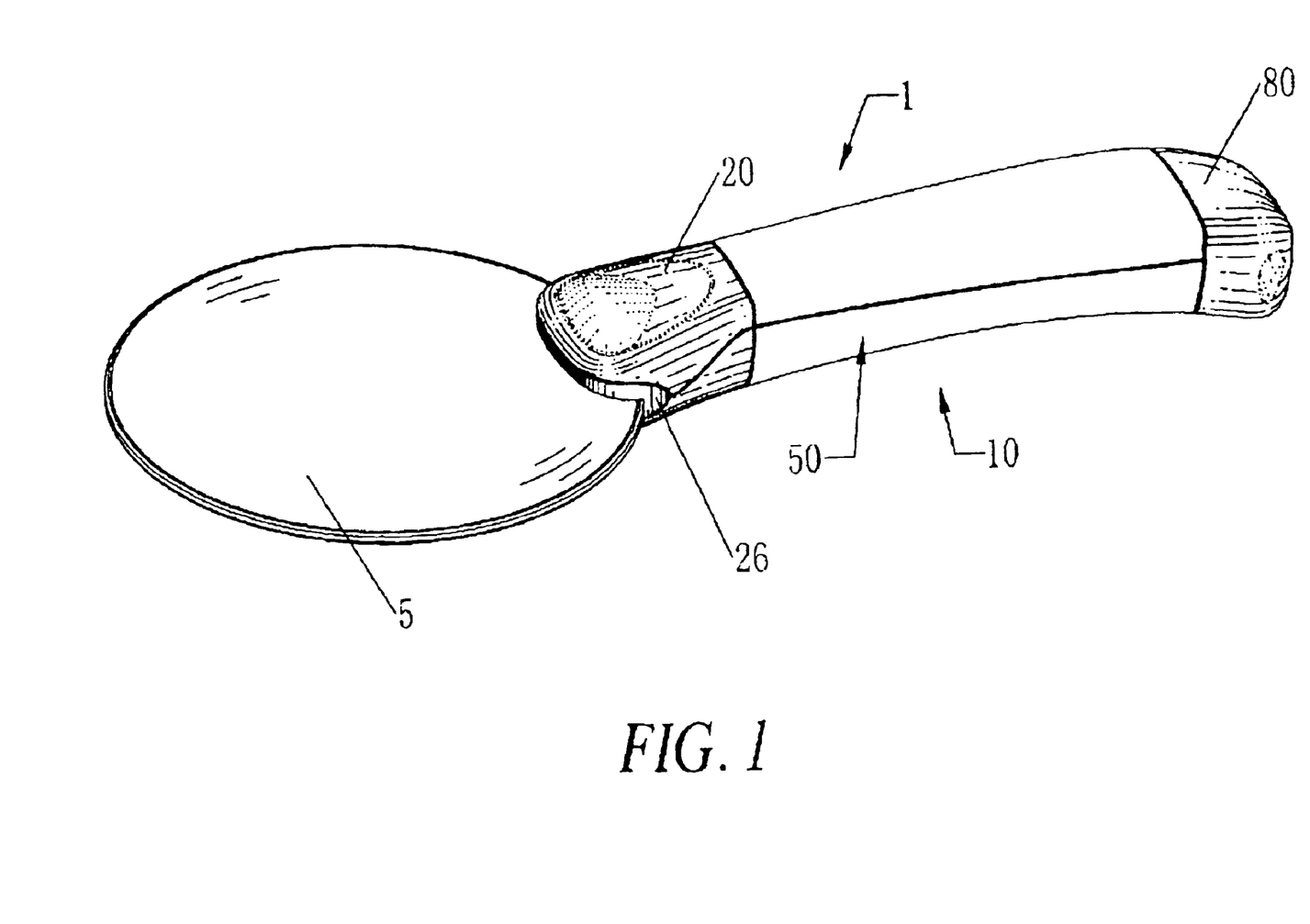
FIG. 1 is a perspective view of a combination magnifying lens and personalizable multipart handle ("magnifier") constructed in accordance with the present invention.

Reference, is initially made to FIG. 1 which illustrates a combination magnifying lens and a personalizable multipart handle for supporting the magnifying lens, generally indicated by the reference numeral 1, and denoted "magnifier" for ease of reference.

Generally speaking, magnifier 1 is comprised of a lens 5 and a multipart handle, generally indicated at 10. As would be clear, handle 10 is coupled to lens 5, the manner by which is more particularly disclosed below. Multipart handle 10 itself is preferably comprised of a head member generally indicated at 20 and a body section generally indicated at 50. Multipart handle 10 also preferably includes means for securing the members of the body section together, as further disclosed below, and therefore may comprise a cap 80, or another type of securing means, such as a rubber or otherwise elastic ring, gasket and/or adhesive.

Figure 2A:
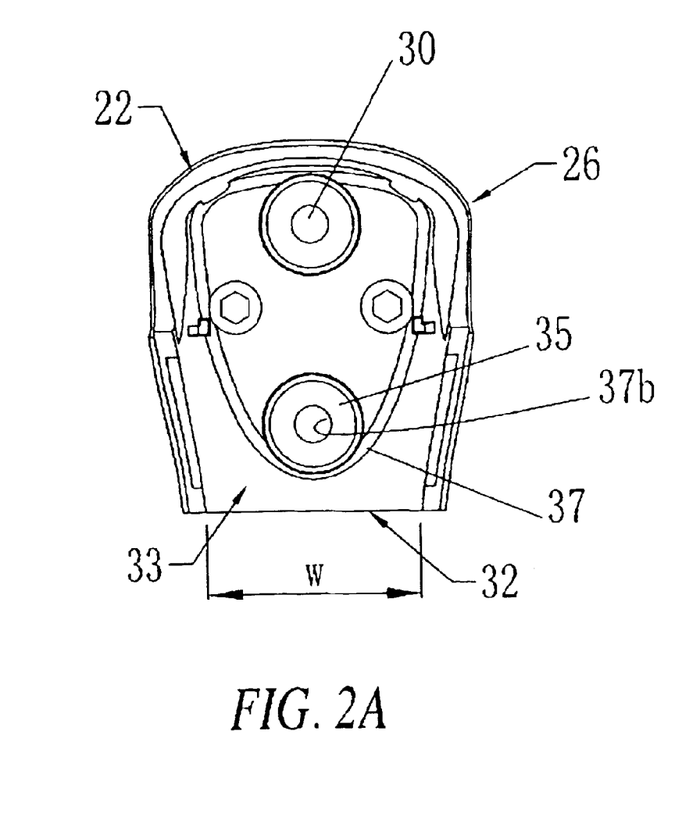
FIG. 2 is a top plan view of a head member, which is part of the multipart handle, constructed in accordance with the present invention.
Figure 2B:
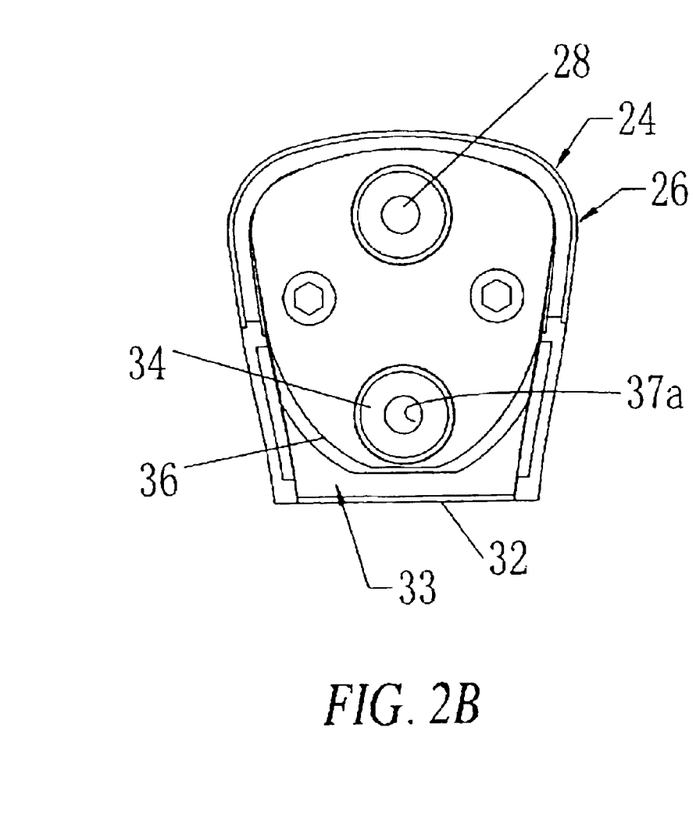
Figure 3:
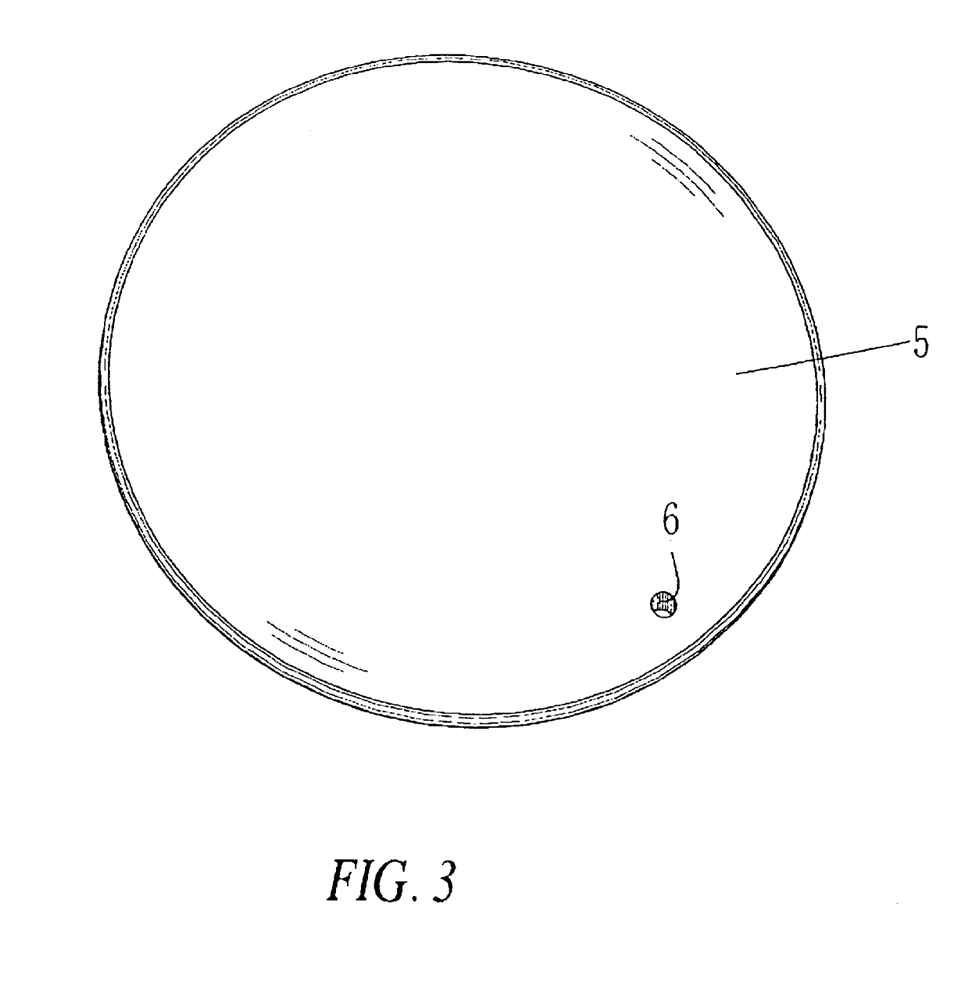
FIG. 3 is a top plan view of a magnifying lens which can be coupled to the multipart handle of the present invention.

Reference is now made in particular to FIGS. 2–7, which illustrate in greater detail the components that comprise magnifier 1. Specifically, FIG. 2 illustrates head member 20 in greater detail. Head member 20 is preferably a two-piece element, namely section 22 and section 24, although molding head member 20 as a unitary member is well within the scope of the present invention. As illustrated, head member 20 has a first end 26 that is coupleable to lens 5. In the preferred embodiment, section 24 of head member 20 includes an aperture 28 through which a securing means, such as a screw or rivet is inserted. A similarly dimensioned aperture 6 through lens 5 (FIG. 3) is provided and aligned with aperture 28 to provide the securing of lens 5 to handle 10. The securing means may also be threadably inserted into a recess 30 in section 22, or if unthreaded, may likewise be press-fit or adhesively coupled thereto. Still further, other ways to secure handle 10 to lens 5 would be well within the purview of one skilled in the art. Head member 20 also has a second end 32, which, when sections 22 and 24 are joined, defines a cavity 33.

Figure 4A:
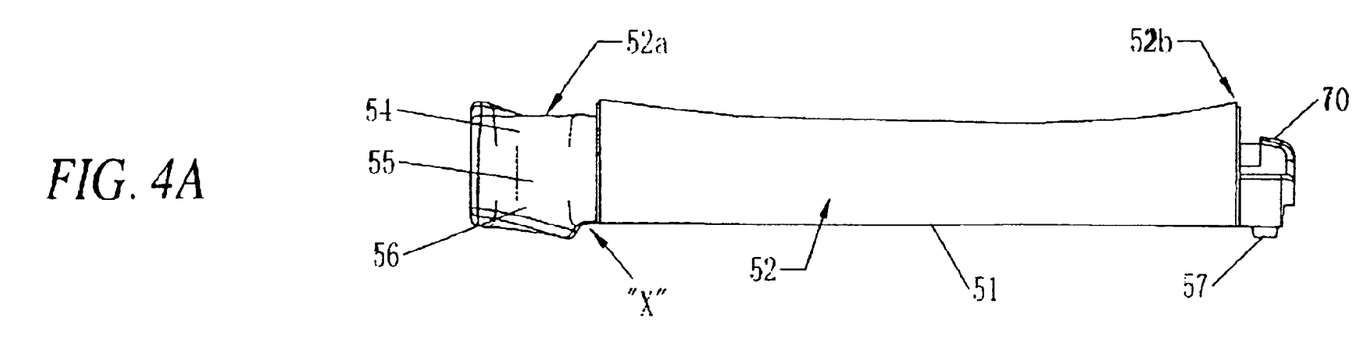
FIG. 4 is a top and a side view of a portion of the body section that comprises part of the multipart handle of the present invention.
Figure 4B:
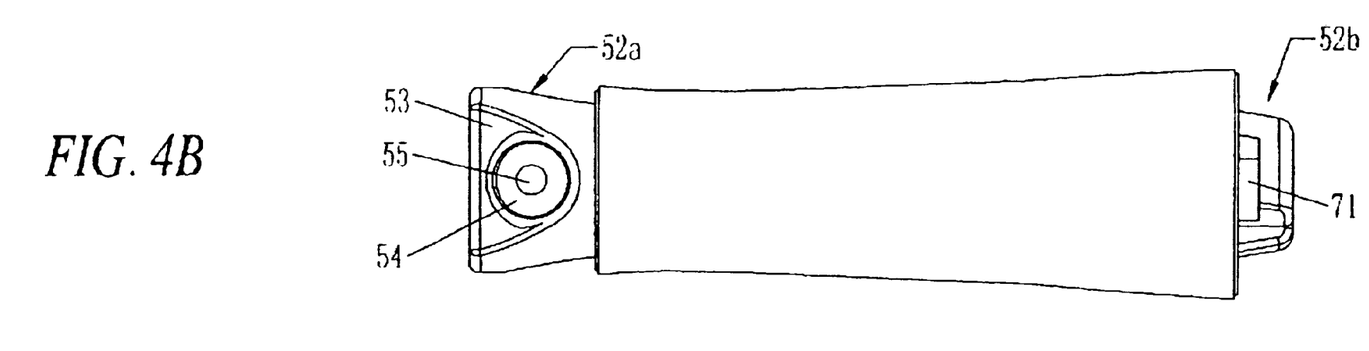
Figure 5:
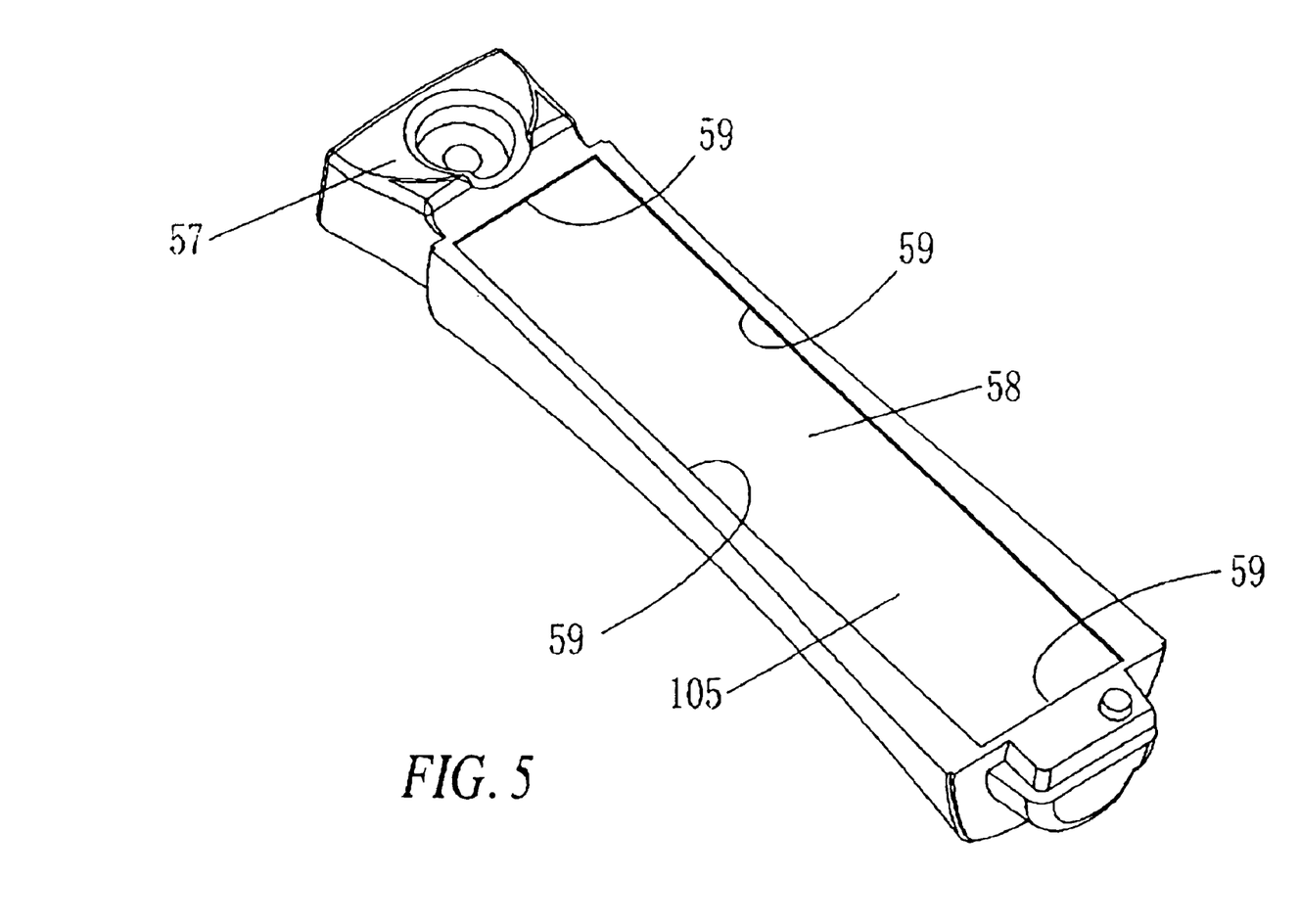
FIG. 5 is a plan view of showing the underside of the member illustrated in FIG. 4.

Turning briefly to FIGS. 4–5, body section 50 is comprised of a first body member 52 having a first end 52a and a second end 52b and a second body member 60 (FIG. 6) having a first end 60a and a second end 60b, In the preferred embodiment, first end 52a of first body member 52 includes a recessed region 53 and a further recessed region 54 which itself includes an aperture 55. Correspondingly dimensioned recessed regions 56, 57 are provided on the other side of first end 52a (FIG. 5).

Returning briefly now to FIG. 2, it can be seen that in the preferred embodiment, each section 22 and 24 includes an aligned raised plug 34, 35 which is respectively positioned in the corresponding recessed region 54, 56. Similarly, each section 22 and 24 includes a raised platform 36, 37 surrounding plugs 34, 35 that are likewise dimensioned to fit snugly in respective recessed regions 53, 57. In the preferred embodiment, first body member 52 is constructed to be secured to head member 20 by use of securing means, again, such as a screw or rivet (not shown) passing through aperture 55 of first end 52a. Correspondingly aligned apertures 37a, 37b are provided in each respective section 22 and 24. Preferably, the securing means is threaded so that it can be removed if desired. The remainder of first end 52a of first body member 52 is also received in the cavity of head member 20.

As indicated above, an objective of the present invention is to provide a channel within body section 50, in which a material member (particulars of which are discussed in greater detail below) is received therein, and reference is therefore made specifically to FIG. 5. Creating this channel 105, in the preferred embodiment, is a recessed region 58 in the interior surface of first body member 52. By definition, slightly raised side edges 59 perimeter recessed region 58. As will become clearer below, the channel created by recessed region 58 and edges 59 maintains alignment of the material member when placed therein. Therefore, the depth of recessed region 58 need only be as thick as material member 100.

Figure 6A:
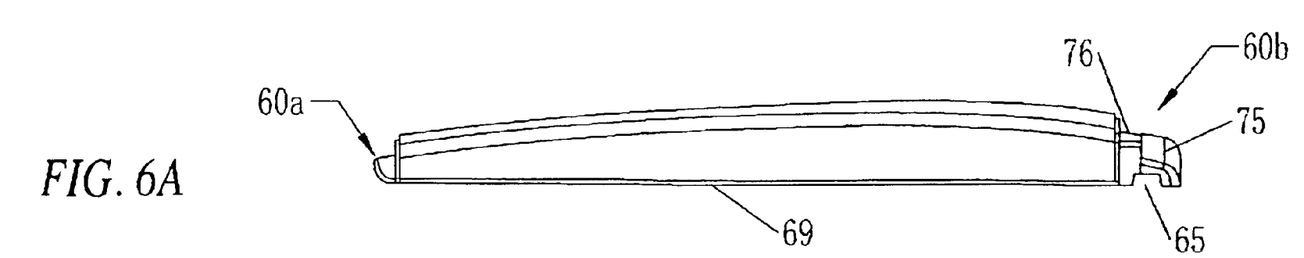
FIG. 6 is a top and a side view of another portion of the body section that comprises part of the multipart handle of the present invention.
Figure 6B:
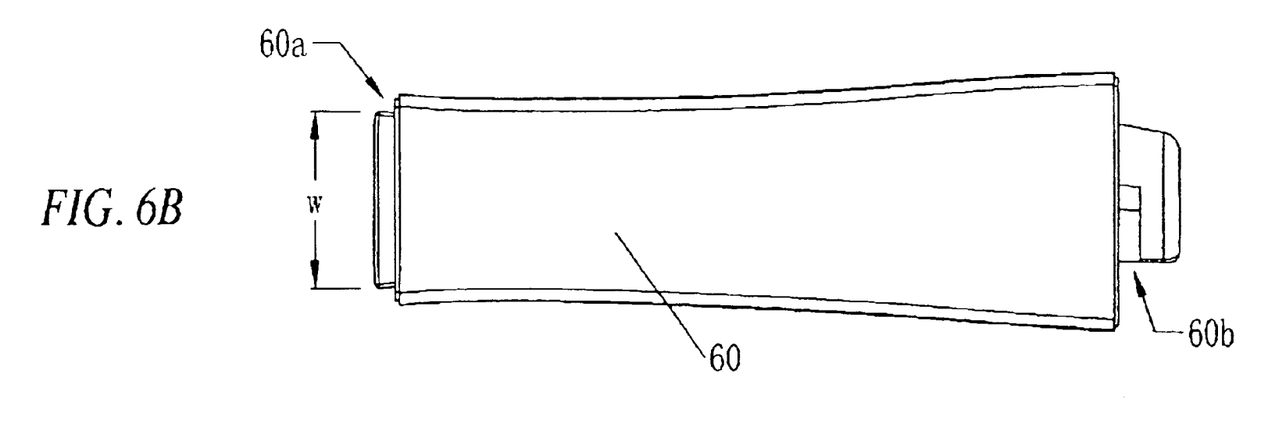

Reference is now made to FIG. 6 which is an illustration of a preferred construction of second body member 60. Specifically, it can be seen that first end 60a of second body member 60 has a preferred outer contoured shape that mates with the inner contoured shape of first end 52a of first body member 52 (see arrow "x"). In this way, the two members 52 and 60 can be placed in snug alignment when secured together, as discussed below.

The width (w) of first end 60a is preferably just slightly less than the width (w) of the opening of the cavity of head member 20 to create a snug fit when the first end 60a is inserted into the cavity of head member 20. In the preferred embodiment, there is no corresponding recessed region in the inner surface 69 of second body member 60. In this way, the material member placed in channel 105 is snugly fit therein and is resisted from movement upon the securing of second body member 60 to interior facing surface 51 of first body member 52.

In the preferred embodiment, the second end 60b of second body member 60 is also provided with a recess 65 which mates with a corresponding tab 57 provided on the interior surface of first body member 52 at the corresponding location at the first end 52b thereof, although it should be readily understood and within the scope of the invention that first body member 52 be provided with the recess while second body member 60 be provided with the tab. Either way, the objective is achieved that when the respective second ends of the body members are secured together, tab 57 will be disposed in recess 65.

It is also preferable that the second end 52a of first body member 52 and second end 60b of second body member 60 each include a respective extending member 70, 75 having preferably interior flat surfaces that can be positioned in facing alignment with each other. On the outer surface thereof, preferably each extending member is provided with a respective groove 71, 76, so that when press-fitted together, the extending members 70, 75 form an end to which cap 80 can be threadably coupled. Again, however, a rubber or otherwise elastic ring or gasket may be used in place of cap 80. Similarly, instead of a cap or a ring, adhesive may be used to secure first body member 52 to second body member 60. Accordingly, it can be seen that several different means can be used to secure the body sections together, although it can be seen that an adhesive type of securing means may be more permanent than a removable cap or ring.

Figure 7:
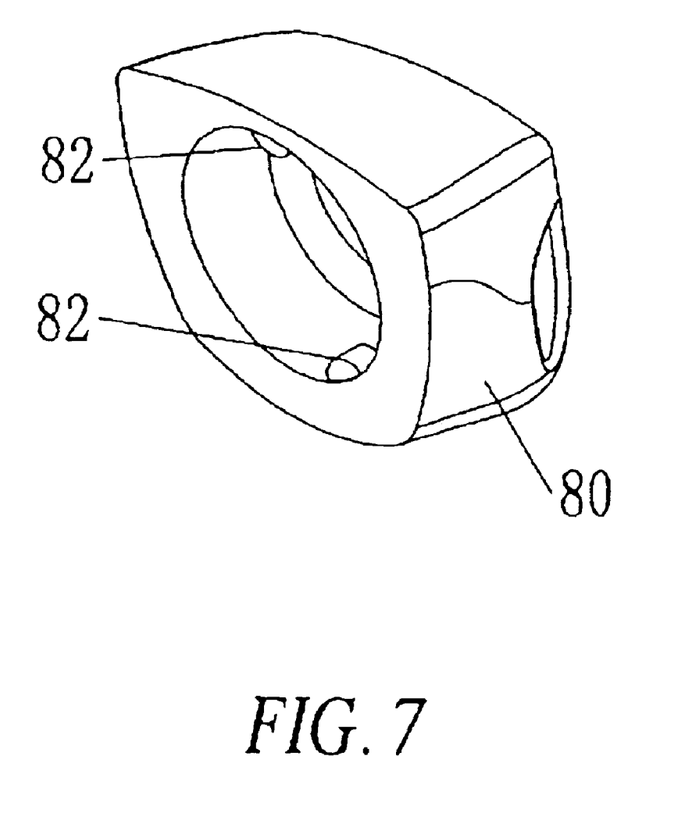
FIG. 7 is a perspective view of an end cap that secures together the portions that comprise the body section of the multipart handle.

If a cap is used, it is preferable that it is as set forth in FIG. 7, thus preferably including at least one, but preferably two raised tabs 82 (to match the preferred construction of having grooves in each of the extending members 70, 75) for threadably engaging the respective grooves 71, 76 formed in extending members 70, 75. In this way, when first body member 52 and second body member 60 are in facing alignment such that their interior surfaces 51, 69 are aligned and press-fitted together, cap 80 is realeasably coupleable to the second ends 52b, 60b (and specifically to the respective extending members 70, 75) of the respective first and second body members 52, 60.

Figure 8:
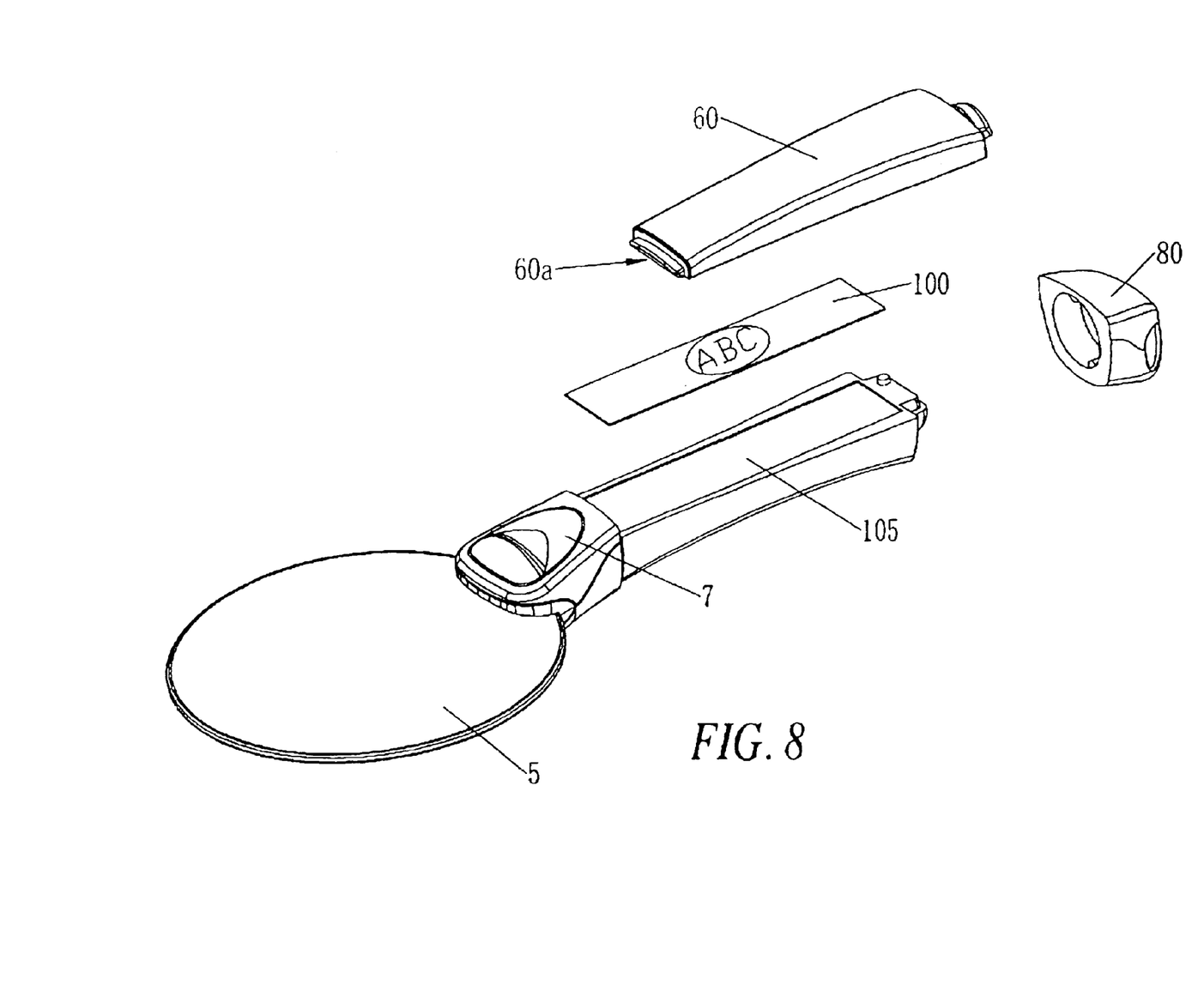
FIGS. 8 and 9 illustrate the present invention in various stages of completeness.
Figure 9:
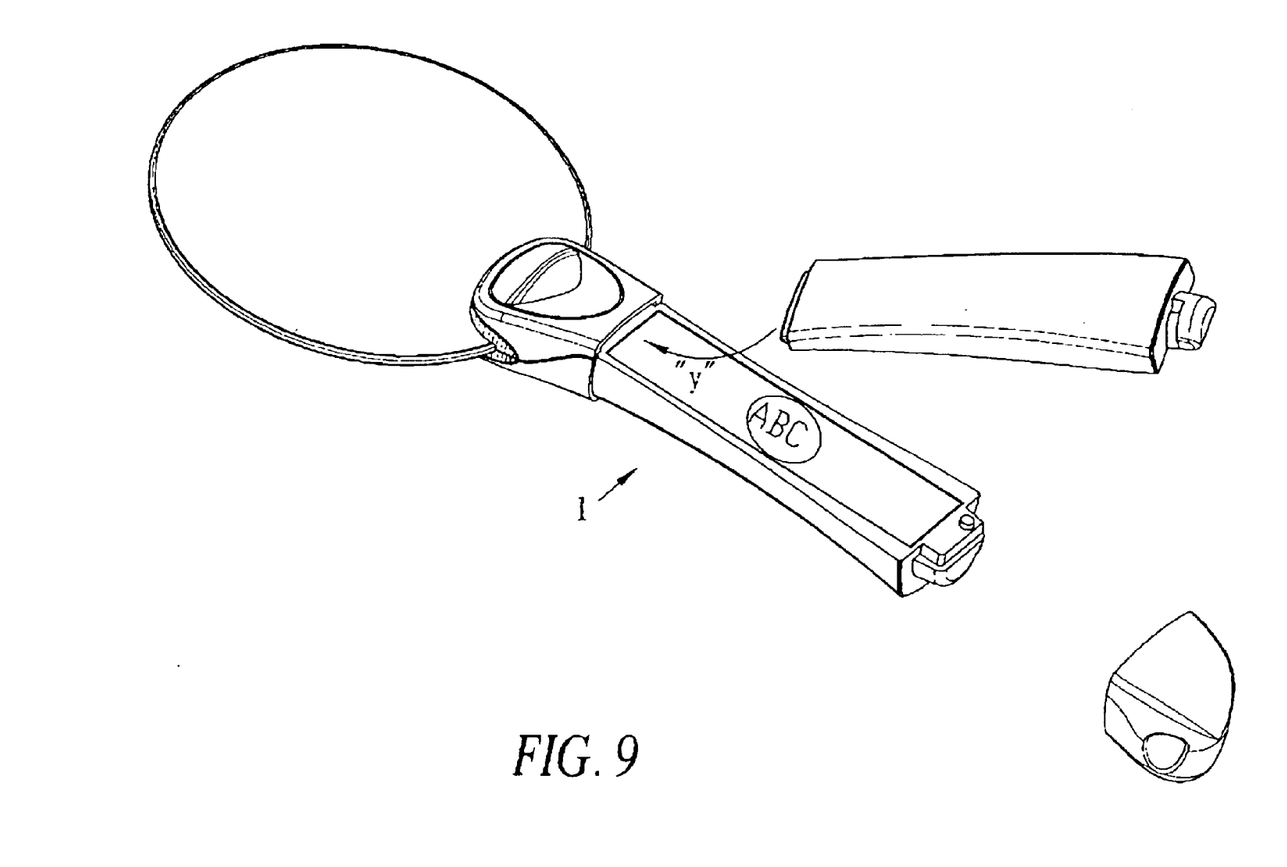

Reference is now made to FIG. 8-9 which also illustrate the material components of the present invention, and the preferred methodology of construction, while hidden from view by a cover 7 is the securing means used to couple handle 10 to lens 5 and to couple first body member 52 to head member 20.

Illustrated therein is an exemplary material member 100, which has indicia thereon indicative of the ABC Company. Material member 100 is preferably comprised of five (5) mil clear polyester film, provided by Dupont. Printing on such film is achieved on a conventional and preferably color printer. However, other suitable materials can be used to create member 100.

In a preferred embodiment, it is preferable that the material on which the logo or other design is printed be transparent. In this way, the logo (or other design) will appear to be floating in the handle 10, since in this embodiment, first and second body members 52, 60 are also preferably transparent (as illustrated in FIGS. 8–9). By creating material member 100 from a transparent material, an objective of the present invention is achieved, namely the creation of a personalized handle that appears to be of very high quality yet at a very minimal cost to manufacture. Specifically, because it is difficult to discern that the logo or other design is simply on a transparent piece of material, the multipart handle will appear to have been expensively molded, thereby adding to the aesthetic appeal of the present invention.

To finalize the assembly of magnifier 1 from the point of assembly illustrated in FIG. 8 to that illustrated in FIG. 1, reference is made to FIG. 9 wherein the material member 100 is positioned in channel 105 formed by recessed region 58 in first body member 52, and the first end 60a of second body member 60 is inserted within the cavity of head member 20 (to be clear, second body member 60 could be provided with the recessed region denoted numeral 58 instead of first body member 52). As illustrated in FIG. 9, it is preferable to next insert first end 60a into the cavity front an angle as indicated by arrow "y", since sliding it along the interior surface of first body member 52 is prohibitive due to the existence of tab 57 extending therefrom.

After the first end 60a of second body member 60 is positioned within the cavity of head member 20, second end 52b of first body member 52 is press-fit to second end 60b of second body member 60 such that tab 57 is received in recess 65. Thereafter, the respective second ends of body members 52 and 60 are secured together with cap 80 or another of the means disclosed above, such as a ring, gasket and/or adhesive. Again, and preferably but not necessarily, cap 80 can be threadably coupled to the extending members of the respective body members 52, 60. As should be appreciated by the foregoing preferred methodology, the step of inserting the first end of the second body member within the cavity of the head member occurs before the steps of aligning the tab with the recess and positioning the tab in the recess.

As can now be seen, the present invention provides for an improved and more efficient way to provide a personalizable handle for an object. While not only applicable thereto, a preferred use of the present invention is for supporting and otherwise being coupled to a magnifying lens. However, constructed in accordance with the present invention, the personalizable handle can be used in connection with a variety of objects, such as brushes, ice scrapers, just to name a few. Additionally, by eliminating expensive molding and printing techniques by utilizing the multipart handle construction and corresponding material member disclosed herein, an improved personalizable handle that is inexpensive to manufacture is provided. However, the same improved construction provides a personalizable handle that is aesthetically pleasing and professional looking.

It will thus be seen that the objects set forth above, among those made apparent from the preceding description, are efficiently attained and, since certain changes may be made in the above constructions and methodologies without departing from the spirit and scope of the invention, it is intended that all matter contained in the above description or shown in the accompanying drawings shall be interpreted as illustrative and not in a limiting sense.

For example, in yet another embodiment, the multipart handle comprises a head similar to that disclosed above, and a body section comprising a first body member having a first end and a second end and a second body member having a first end and a second end; wherein the first end of the first body member is securable within the cavity of the head member and the first end of the second body member is securable within the cavity of the head member; and wherein both the first and second body members each have an interior surface that is in facing alignment with each other when the respective first ends of the body members are positioned in the head member, all similar to that disclosed above, but in this alterative embodiment, indicia is provided upon the interior surface of at least one of the first or second body members, such as by way of example and not limitation, silk-screening thereon. For this reason, a channel as disclosed above is not needed. For purposes of disclosing all details of this embodiment, it should be viewed that FIG. 9 illustrates a silk-screened logo on the interior surface 51 of body member 52, although FIG. 9 actually shows a material member 100, for purposes of illustration, FIG. 9 can be viewed as illustrating this alternative embodiment. Lastly, means for securing the second end of the first body member to the second end of the second body member is also provided by way of the aforementioned cap, ring, gasket and/or adhesive. Here also, it is preferably that the body section is at least partially, if not fully transparent, so that the indicia, which is viewable through the body section, appears to be floating within the body section when the respective second ends of the body members are press-fitted together and the indicia is viewed therethrough. One skilled in the art would well understand the silk-screening process.

Lastly, to be sure, the term "indicia" is meant to include both letters and designs of both an ornamental or functional nature.

While the invention has been particularly shown and described with respect to preferred embodiments thereof, it will be understood by those skilled in the art that changes in form and details may be made therein without departing from the scope and spirit of the invention.

What is claimed is:

1. A multipart handle for coupling to a lens, wherein the multipart handle comprises:
   a head member comprising:
      a first end coupleable to the lens; and
      a second end having a cavity formed therein;
   a body section having a channel for receiving a material member, wherein the body section comprises:
      a first body member having a first end and a second end; and
      a second body member having a first end and a second end; wherein:
         the first end of the first body member is securable within the cavity of the head member, and
         the first end of the second body member is securable within the cavity of the head member; and
   means for securing the second end of the first body member to the second end of the second body member;
   wherein the securing together of the respective second ends of the body members maintains the material member in the channel.

2. The multipart handle as claimed in claim 1, wherein the first body member includes a tab and the second body member includes a recess for receiving the tab, wherein when the respective second ends of the body members are press-fitted together, the tab is disposed in the recess.

3. The multipart handle as claimed in claim 1, wherein the channel is provided in an interior facing surface of the first body member that faces the second body member; the channel being defined by side edges that perimeter a recessed region in the interior facing surface of the first body member;
   wherein the channel maintains alignment of the material member received therein.

4. The multipart handle as claimed in claim 1, wherein:
   the second end of the first body member and the second end of the second body member each include a surface that can be positioned in facing alignment with each other;
   the second end of the first body member has an extending member and the second end of the second body member has an extending member;
   at least one of the extending members includes a groove formed therein;
   the means engages the at least one groove; and
   the means is releasably coupleable to the second ends of the respective first and second body members when engaged with the at least one groove.

5. The multipart handle as claimed in claim 4, wherein the means for securing the second ends of the first body member to the second body member is comprised of a cap that includes at least one tab that engages the groove.

6. The multipart handle as claimed in claim 1, wherein the first body member or the second body member includes a tab and the other of the first or second body member includes a recess for receiving the tab, wherein when the respective second ends of the body members are press-fitted together, the tab is disposed in the recess; and
   wherein the first end of the first body member is secured within the cavity of the head member by securing means, and wherein the first end of the second body member is secured within the cavity of the head member when the tab is disposed in the recess.

7. The multipart handle as claimed in claim 1, including a material member, wherein the material member comprises indicia thereon; and wherein the body section is at least partially transparent;
   wherein the indicia is viewable through the body section, and when the respective second ends of the body members are press-fitted together the indicia appears to be floating within the body section when viewed therethrough.

8. In combination, a magnifying lens and a personalizable handle for coupling to the magnifying lens, wherein the handle comprises:
   a head member comprising a first end coupled to the magnifying lens, and a second end having a cavity formed therein;
   a body section having a channel for receiving a material member, wherein the body section comprises a first body member having a first end and a second end, a second body member having a first end and a second end, and wherein the channel is provided in at least an interior facing surface of the first body member that faces the second body member; the channel being defined by side edges that perimeter a recessed region in the interior facing surface of the first body member;
   means for securing the second end of the first body member to the second end of the second body member;
   wherein:
      the first end of the first body member is secured within the cavity of the head member by securing means,
      the securing together of the respective second ends of the body members assists in maintaining alignment of a material member placed in the channel; and
      the first end of the second body member is secured within the cavity of the head member by the securing together of the respective second ends of the first and second body members.

9. The combination magnifying lens and personalizable handle as claimed in claim 8, wherein the first body member or the second body member includes a tab and the other body member includes a recess for receiving the tab, wherein when the respective second ends of the body members are in press-fitted together, the tab is disposed in the recess; and
   wherein the first end of the second body member is further secured within the cavity of the head member when the tab is disposed in the recess.

10. The combination magnifying lens and customizable handle as claimed in claim 8, including a material member, wherein the material member comprises indicia thereon; and wherein the body section is at least partially transparent;
   wherein the indicia is viewable through the body section and when the respective second ends of the body members are press-fitted together the indicia appears to be floating within the body section when viewed therethrough.

11. A multipart handle for coupling to a lens, wherein the multipart handle comprises:
   a head member comprising a first end coupleable to the lens and a second end having a cavity formed therein;
   a body section comprising a first body member having a first end, a second end and an interior surface with indicia provided thereon, and a second body member having a first end and a second end; wherein the first end of the first body member is securable within the cavity of the head member and the first end of the second body member is securable within the cavity of the head member; and wherein both the first and second body members each have an interior surface that is in facing alignment with each other when the respective first ends of the body members are positioned in the head member; and means for securing the second end of the first body member to the second end of the second body member;

whereby when the respective second ends of the body members are secured together the indicia appears to be floating within the body section when viewed through the body section.

12. The multipart handle as claimed in claim 11, wherein the indicia is silk-screened on the interior surface of the at least one of the first or second body members.

* * * * *